US011657038B1

(12) United States Patent
Attaluri et al.

(10) Patent No.: US 11,657,038 B1
(45) Date of Patent: May 23, 2023

(54) CONTEXT PRESERVATION DURING SERVER RESTART

(71) Applicant: Amazon Technologies, Inc., Seattle, WA (US)

(72) Inventors: Gopi Krishna Attaluri, Cupertino, CA (US); Ian Kosseff, Kirkland, WA (US); Kamal Kant Gupta, Belmont, CA (US); Saileshwar Krishnamurthy, Palo Alto, CA (US); Alok Nandan Nikhil, Seattle, WA (US); Alexandre Verbitski, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 16/370,728

(22) Filed: Mar. 29, 2019

(51) Int. Cl.
*G06F 16/00* (2019.01)
*G06F 16/23* (2019.01)
*G06F 11/14* (2006.01)
*G06F 9/455* (2018.01)

(52) U.S. Cl.
CPC ...... *G06F 16/2379* (2019.01); *G06F 9/45558* (2013.01); *G06F 11/1438* (2013.01); *G06F 11/1464* (2013.01); *G06F 2009/45583* (2013.01); *G06F 2009/45595* (2013.01); *G06F 2201/84* (2013.01)

(58) Field of Classification Search
CPC ............. G06F 11/1438; G06F 9/45558; G06F 16/2379; G06F 11/1464; G06F 2201/84; G06F 2009/45583; G06F 2009/45595
USPC ......................................... 707/676, 600–899
See application file for complete search history.

(56) References Cited

U.S. PATENT DOCUMENTS

| | | | | |
|---|---|---|---|---|
| 10,305,743 B1* | 5/2019 | Angrish | ................... | H04L 41/22 |
| 10,733,054 B2* | 8/2020 | Chacón | ............... | G06F 11/1438 |
| 2002/0105545 A1* | 8/2002 | Carter | ................... | H04L 63/083 |
| | | | | 715/752 |
| 2004/0042468 A1* | 3/2004 | Kovacs | ................... | H04L 69/40 |
| | | | | 370/401 |
| 2009/0182643 A1* | 7/2009 | Holstein | ................ | G06Q 40/12 |
| | | | | 705/26.1 |
| 2012/0265743 A1* | 10/2012 | Ivanova | .............. | G06F 16/2379 |
| | | | | 707/E17.055 |
| 2013/0066949 A1* | 3/2013 | Colrain | ................... | G06F 9/466 |
| | | | | 709/203 |
| 2016/0154701 A1* | 6/2016 | Desai | .................. | G06F 11/0793 |
| | | | | 714/19 |
| 2017/0242682 A1* | 8/2017 | Alluri | ...................... | G06F 8/656 |
| 2019/0028375 A1* | 1/2019 | Kandula | ............. | H04L 41/0893 |
| 2019/0147086 A1* | 5/2019 | Pal | .................... | G06F 16/24535 |
| | | | | 707/718 |

* cited by examiner

*Primary Examiner* — Michelle N Owyang
*Assistant Examiner* — Shirley D Hicks
(74) *Attorney, Agent, or Firm* — Nicholson De Vos Webster & Elliott LLP

(57) ABSTRACT

Techniques for a context preservation during server restart are described. A restart of a database server having at least one open communications session with a database client is initiated. The database server can be executed by a compute instance hosted by a computer system of a provider network. A restarted database server is launched. The restarted database server obtains session state data to resume the at least one open communications session with the database client, the session state data including one or more session variables. The restarted database server receives a transaction from the database client.

20 Claims, 8 Drawing Sheets

CONTEXT PRESERVATION DURING SERVER RESTART

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. The advent of virtualization technologies has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Leveraging virtualization technologies, many public data center operators provision compute and storage resources for both internal and external customer needs. For example, the operator or a customer may leverage compute resources to host a web or other servers to communicate with clients within or without of the data center network. One popular set of services involve databases, where the operator manages a set of compute and storage resources to host a database for a customer. Such databases may be of various types, such as relational databases often used by for transactional applications, non-relational databases for internet-scale applications, data warehouses for analytics, in-memory data stores for caching and/or real-time workloads, graph databases for building applications with highly-connected data, time series databases for measuring changes over time, ledger databases to maintain a complete and verifiable record of transactions, etc.

BRIEF DESCRIPTION OF DRAWINGS

Various embodiments in accordance with the present disclosure will be described with reference to the following drawings.

DETAILED DESCRIPTION

Various embodiments of methods, apparatus, systems, and non-transitory computer-readable storage media for context preservation during server application restart are described. Using traditional techniques to restart a server application, ongoing communications sessions between client applications and the server application are interrupted. Once the server application has restarted, each client application would have to re-establish communications sessions with the server application. The delay associated with re-connecting to the database server and re-establishing the session parameters is undesirable.

Aspects of the present disclosure reduce or eliminate interruptions associated with a restart of the server application from the perspective of the client applications. At a high level, a server application's state data related to open communications sessions with client applications is preserved. Such state data (sometimes referred to as context) can include application-level context (e.g., session data) to allow the restarted server application to recreate the state of open communications sessions with clients. The state data can be preserved in a memory or storage device that is local (e.g., connected via a bus or interconnect) or remote (e.g., connected via a network) to the underlying physical computer system that is hosting the server application. Once preserved, the server application can be restarted. Since the server is a software application, the server can be "restarted" by, for example, launching another server application while the original server application continues to execute in the same environment, terminating the original server application before launching another server application in the same environment, or launching another server application in a different environment than the original server application. The restarted server application can use the preserved application-level context to recreate application-level communications (e.g., sessions) with clients. In some cases, such as when the restarted database server is changing computer systems or environments, additional state data, such as network-level context (e.g., socket data), is preserved to allow those connections to be recreated and communications to be resumed. The restarted server application can use the preserved network-level context to re-establish network-level communications. From the perspective of any connected client applications, the communications session with the server application remains open during the time associated with the switchover from the original server application to the restarted server application.

Figure 1:
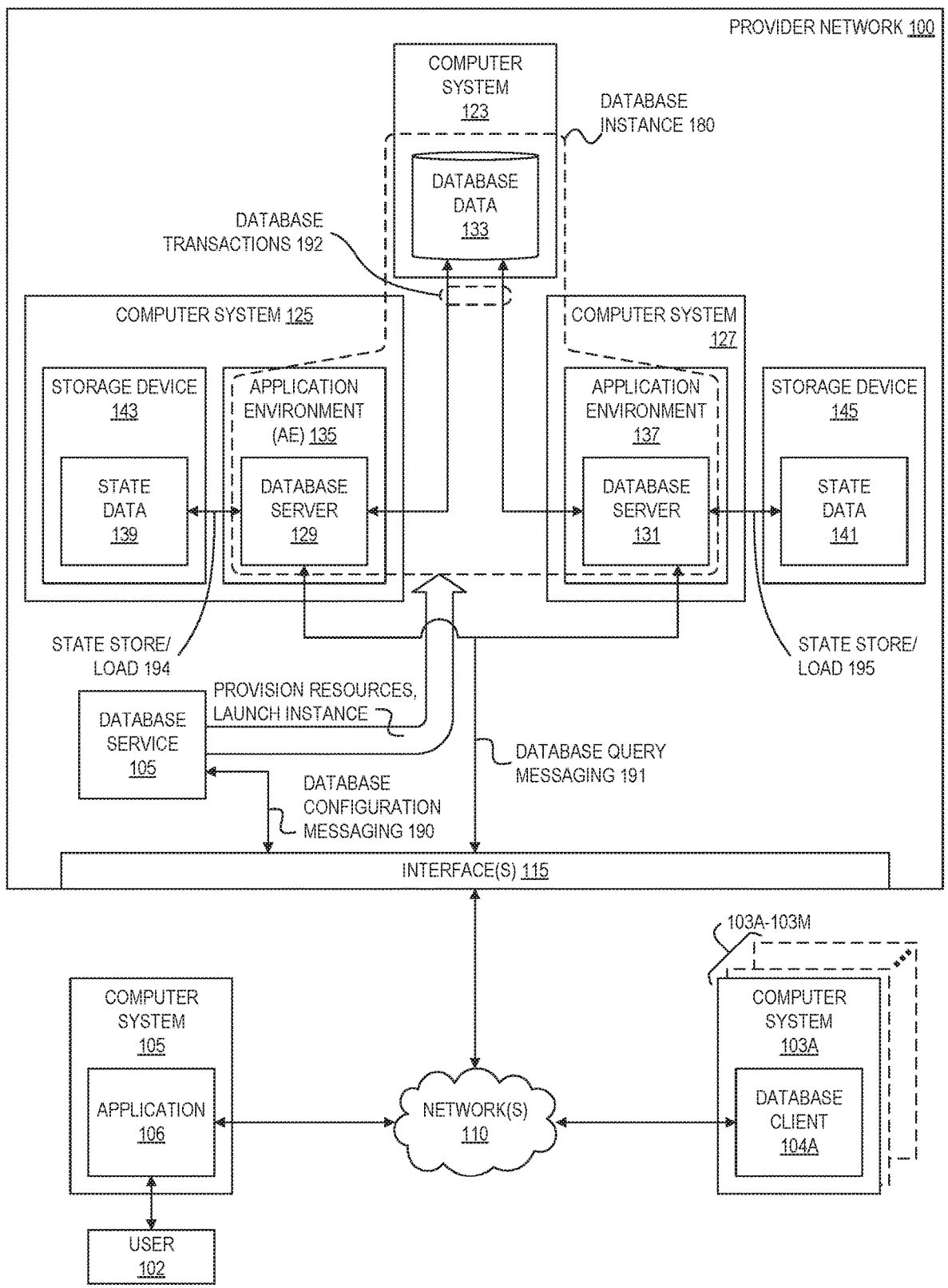
FIG. 1 is a diagram illustrating an environment for context preservation during server restart according to some embodiments.

FIG. 1 is a diagram illustrating an environment for context preservation during server restart according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, a database service that can run queries involving data and/or store data, etc.

To provide the these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device such as a computer system. Thus, a user may directly utilize a compute instance hosted by the provider network to perform a variety of computing tasks, or may indirectly utilize a compute instance by submitting code (e.g., a query) to be executed by the provider network, which in turn utilizes a compute instance to execute the code (typically without the user having any control of or knowledge of the underlying compute instance(s) involved).

The users (or "customers") of provider networks 100 may utilize one or more user accounts that are associated with a customer account, though these terms may be used somewhat interchangeably depending upon the context of use. Users may interact with a provider network 100 via an application 106 executing on a client computer system 105. The application 106 can communicate with the provider across one or more intermediate networks 110 (e.g., the internet) via one or more interface(s) 115. The interface(s) can provide the application 106 access to features of the provider network 100 via, e.g., application programming interfaces (APIs). The application 106, such as a web browser or console, can issue calls to the API(s) of the interface 115. The interface(s) 115 may be part of, or serve as a front-end to, a control plane of the provider network 100 that includes "backend" services supporting and enabling the services that may be more directly offered to customers.

One such service is a database service 105. The database service 105 may be implemented as one or more software modules executed by one or more computer systems (not shown) of the provider network 100. The database service 105 may be a managed service that makes it easy for users to set up, operate, and scale databases in the provider network 100 in the form of database instances. The database service 105 may rely on the virtualization techniques described above to allocate the compute and storage resources needed to host a database instance. For example, the database service 105 may provision resources of one or more computer systems of the provider network 100 to host a database instance. The database service 105 may provide resizable capacity while managing time-consuming database administration tasks. The database service 105 may provide one or more of a variety of database engines (e.g., relational database engines such as MySQL, MariaDB, Oracle™, SQL Server, PostgreSQL, etc., and/or non-relational database engines) allowing existing code, applications, and/or tools to work seamlessly with databases provided by the database service 105. In some embodiments, the database service 105 may perform administrative tasks such as automatically backing up databases, upgrading and/or patching database software, scaling the compute resources or storage capacity associated with its database instances, etc.

A user 102 of the provider network 100 may interact with the database service 105 to implement one or more database instances, which may include the user 102 utilizing a console of a web-based application 106 to issue one or more requests 190 to an endpoint associated with the database service 105 indicating the user's 102 desire to launch/configure one or more database instances. A management engine or controller (not illustrated) of the database service 105 may then, in response to request(s) 190, perform operations to obtain compute resources (e.g., VMs executed by host device(s)) for the database instance(s) 130 within the provider network 100, launch VM images (optionally having code for the database pre-installed), optionally launch or install databases on the host device(s), configure the database instance, configure security rules and/or permissions used by the database instance(s) 130 or used for accessing the database instance(s), etc.

In the illustrated example, a user 102 has launched a database instance 180. As illustrated, the database instance 180 includes a database server application 129 ("database server") and a database server 131 that access database data 133. Database client applications 104A-104M ("database client") can issue queries 191 (e.g., SQL queries) to the database servers 129, 131. The database servers 129, 131 execute received queries 191 by reading data from and/or writing data to the database data 133, labeled here as database transactions 192. Database client applications 104 may be executed by computer systems 103A-103M outside of the provider network 100 and interact with a database instance 180 via the network(s) 110 and interface(s) 115. For example, a database client application 104 may submit a query (sometimes referred to as a transaction) either to the database instance 180 which is routed to one of the database servers 129, 131 by the provider network 100 or to one of the database servers 129, 131 directly. Other database client applications (not shown) may be executing within the provider network 100 (e.g., hosted on a virtual machine) and interact with the database instance via the provider network 100. In some embodiments, the transactions may be sent using HyperText Transfer Protocol (HTTP) messages to endpoint(s) associated with the database instance(s) that provide an HTTP-based interface.

Figure 8:
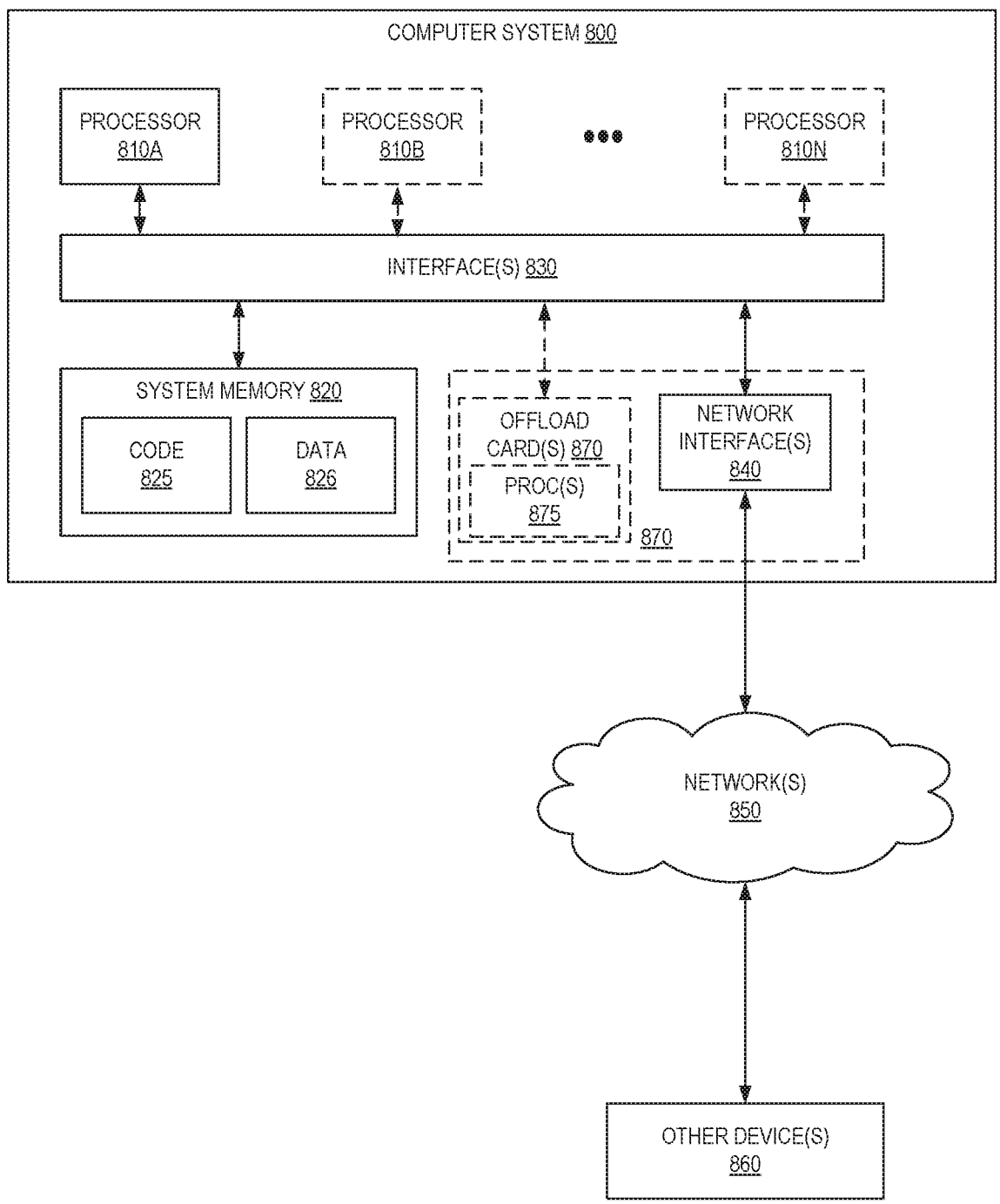
FIG. 8 is a block diagram illustrating an example computer system that may be used in some embodiments.

The database service 105 has provisioned resources of the provider network 100 to host the database instance. In particular, the database server 129 is hosted a computer system 125, the database server 131 is hosted by a computer system 127, and the database data 133 is hosted by a computer system 123. Computer systems 123, 125, 127 are coupled within the provider network 100. An exemplary computer system is illustrated in FIG. 8. In some embodiments, one or more of the database servers 129, 131 and the database data 133 are hosted by a plurality of computer systems in a distributed manner. The resources can be provisioned through the use of virtualization techniques. For example, the database servers 129, 131 are executed within application environments 135, 137, respectively, that use one or more virtualization techniques. Exemplary application environments are described below with reference to FIGS. 2A and 2B. The database data 133 may be made available through a storage service and provided as object- or block-level storage to the database servers 129, 131. As illustrated, the database data 133 is remotely connected to the database servers 129, 131 via the provider network 100. In other embodiments, the database data 133 may be hosted by or replicated on a computer system that hosts a database server.

Once the database service 105 has provisioned the resources for and launched a database instance, such as database instance 180, but prior to a database server of the database instance 180 receiving any connection-establishment requests from a database client 104, the database server and its associated application environment can be considered to be in a "default" state. Such a state may include the database server configured to listen for connection requests from database clients. In some embodiments, this default state can be the same state that the database server and its associated application environment would enter into after a restart.

Database clients establish a logical connection to database servers, sometimes referred to herein as a session. The logical connection may rely on one or more supporting protocols, such as Transmission Control Protocol/Internet Protocol (TCP/IP), to establish a connection over which application-level communications can take place (e.g., between database clients and the database server). Under TCP, such network-level communications may be supported by networking components (e.g., software modules) of the application environment that allow supported applications to establish socket-based communications with other applications. For example, the database server 129 can listen on a particular port number for connection requests from a database client and, after a handshaking procedure, obtain a socket associated with the communications to/from the database client. In some embodiments, the socket references a data structure that tracks data about the network-level communications, such as the IP addresses and port numbers of the two endpoints of the communications (e.g., the database client and the database server).

With network-level communications established, the database client can establish a session with the database server via which the database client can submit queries 191 to the database server, and the database server 129 can respond to the database client database client 104. Such a session between the database client and database server may include a session name and a number of session-specific variables, some of which can be set by the database client and others of which are known only to the database server.

In some embodiments, context preservation during server restart involves initiating a restart, preserving state information (e.g., non-default state data), performing the restart, and using the preserved state information to resume communications with clients on a restarted database server rather than the original database server. For example, sometime while a session between a database client 104 and the database server 129 is ongoing, an entity may initiate a restart of the database server 129. The entity initiating the restart may be the database server 129 itself, a component of the application environment, an external component of the provider network (e.g., a service such as the database service), or a user-initiated restart (e.g., received in a command from the application 106 initiated by the user 102). An exemplary cause for restart is a memory leak in the database server 129 causing it to consume more and more of the available memory and resulting in degraded performance. For example, the database server 129 may monitor its own memory usage and initiate a restart by sending a request to the application environment 135, or a component of the application environment 135 (e.g., a resource manager) or another service of the provider network 100 may monitor the resource usage of the database server 129 and initiate a restart. If an entity other than the database server 129 initiates the restart, that entity can send a message to the database server 129 to initiate the restart.

Once a restart operation has been initiated, the database server 129 stores state data 139 related to ongoing sessions with client applications 104. State data 139 includes, for each session between a database client 104 and the database server, the session-specific variables. State data 139 can further include a session name associated with a given session. State data 139 can further include identifiers associated with network-level communications context between the database server 129 and database clients 104 (e.g., file descriptors associated with open sockets and/or IP address and port number information associated with database clients). State data 139 can further include user-specified variables, temporary tables (e.g., tables constructed in the memory of the database server 129 with data retrieved from the database data 133), prepared statements (e.g., queries that can be referenced with a handle and repeated with different variables), and the like. State data 139 can further include global variables that apply to multiple ongoing sessions with client applications 104.

In some embodiments, the database server 129 times storing the state data 139 to allow for a restart by waiting for a relatively quiescent period on some number of open connections between database clients 104 and the database server 129. For example, the database server 129 may delay until at least half of the connections are idle (e.g., no pending queries).

As illustrated, the state data 139 is stored in a storage device 143, which may be a memory component of the computer system 125, such as a random-access memory (RAM) device or solid-state drive (SSD). Note that although the storage device 143 is illustrated within the computer system 125, in other embodiments the storage device may be remote and connected to the computer system via the provider network 100 (e.g., as shown for database server 131 storing state data 141 in storage device 145).

Once state data 139 is stored, the database server 129 can terminate or the application environment 135 can terminate the database server 129. To avoid changes to state that were not stored prior to carrying out the restart, the database server 129 may halt ingestion of communications data from clients once state data 139 is stored. Note that the termination should avoid closing any open connections to database clients 104 (e.g., client-specific sockets) that were established by the terminating database server 129, as described herein.

Since the database server 129 is an application, its restart can be handled in a number of ways. In some embodiments, the database server 129 manages the restart. For example, after preserving state data 139, the database server 129 can issue a call to the application environment 135 to fork its process to create a duplicate, child process of the forked application. The child process can then issue a call to the application environment 135 to execute the executable associated with the database server 129 with one or more parameters indicating state data 139 should be restored. The parent process (that issued the fork call) can then terminate while the child process has access to the various resources and file descriptors that were established by the parent process. In some embodiments, the application environment 135 manages the restart of the database server 129.

After a restart, the database server 129 accesses the state data 139 to recreate the sessions between the database server 129 and database clients 104 and resumes those sessions via the network-level communications that remained open during the restart (e.g., using preserved file descriptors associated with the open socket(s)). In some embodiments, the application environment 135 initiates the loading of state data 139 by the restarted database server 129 by including a parameter in the command to launch the restarted database server, the parameter indicating that state data should be loaded. In other embodiments, the database server 129 may set a flag when preserving the state data 139 that indicates the state data 139 should be loaded and, upon launch, inspect the state data 139 to determine whether the flag is set. If so, the database server 129 can load the state data 139 and clear the flag.

In some embodiments, the database server 129 issues an error message for any pending queries 191 from database clients 104 that have not been fulfilled prior to restart, which, upon receipt, will cause the database clients 104 to re-issue the queries. In some embodiments, the state data 139 further includes, for each session between a database client 104 and the database server, any pending queries 191. In such a case, the restarted database server 129 can attempt to resume any pending queries 191 (e.g., read-only queries) and, for those that cannot be resumed, issue error messages to the database client 104 after restart to cause the database client 104 to re-issue those queries. Exemplary queries that may be unable to be resumed may include queries involving writes to the database that have been in-flight when the database server 129 restarted (e.g., were not committed to the database data 133). Relying on transactional guarantees of the database engine, the restarted database server 129 can issue error messages for pending queries that are unable to be resumed. By storing pending queries in the state data 139 rather than issuing error messages for those queries prior to restart, the amount of time the database server 129 becomes unavailable is reduced as the database server 129 avoids the additional time associated with issuing error messages before restart.

From the perspective of any connected database clients 104, the database client 104 remains connected to the database server 129 and thus avoids the downtime associated with re-establishing connections and session-level communications with a database server restarted in a traditional manner.

In some embodiments, the restart may further include a portion of the application environment in which the database server 129 is executing. In such a case, the state information that is backed up further includes non-default application environment state information. For example, the state data can further include network-level context for established connections between a database server and database clients (e.g., data from sockets established by the networking components of an operating system or operating system kernel of the application environment 135). Additional details regarding restarting a portion of the application environment are provided below.

Although described in the context of client-server applications in a database context, the above-described techniques for context preservation during server restart can be used in many other client-server arrangements, including, for example, a client and server process executing on the same computer system.

Figure 2B:
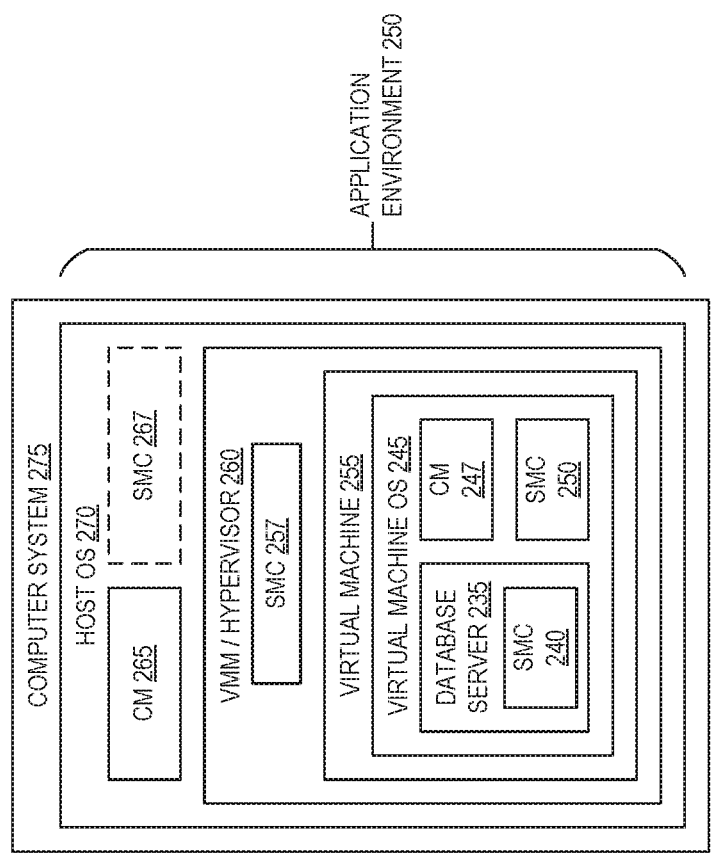
FIG. 2B is a diagram illustrating an exemplary application environment for context preservation during server restart of a virtual machine according to some embodiments.
Figure 2A:
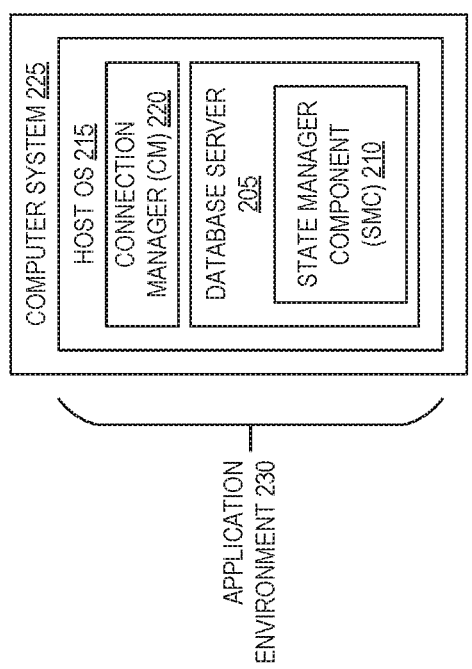
FIG. 2A is a diagram illustrating an exemplary application environment for context preservation during server restart of a server process according to some embodiments.

FIG. 2A is a diagram illustrating an exemplary application environment for context preservation during server restart of a server process according to some embodiments. As illustrated, an application environment 230 includes a host operating system (OS) 215, such as a Linux or Windows based operating system. In this example, the host OS 215 is executed by the underlying computer system 225. The host OS includes a connection manager 220, such as a TCP sockets implementation, and supports execution of a database server 205.

In this example, the database server 205 is to be restarted. The database server 205 includes a state manager component ("SMC") 210. The SMC 210 is a software component of the database server 205 that stores and loads state data associated with the database server 205 (e.g., session-specific variables for each established connection to a database client prior to a restart). After the SMC 210 has stored state data, the database server 205 is terminated without closing any established connections (e.g., sockets) maintained by the connection manager 220. In some embodiments, the SMC 210 stored state data that includes identifiers of the connections or sockets being maintained by the connection manager 220. Such identifiers may be file descriptors that the connection manager 220 returned to the database server 205 upon establishing connections with database clients. Once the database server has restarted, the SMC 210 loads the state data (e.g., via a command line parameter or flag in the state data), including the identifiers, to allow the restarted database server to resume communications with the connected database clients.

FIG. 2B is a diagram illustrating an exemplary application environment for context preservation during server restart of a virtual machine according to some embodiments. As illustrated, an application environment 250 includes a host OS 270, such as a Linux or Windows based operating system. In this example, the host OS 270 is executed by the underlying computer system 275. The host OS 270 includes a connection manager 265, such as a TCP sockets implementation, and supports execution of a hypervisor application 260, sometimes referred to as a virtual machine manager (VMM) that allows for the hosting of VMs, such as VM 255, by the computer system 275. As described elsewhere herein, a VM allows access to a portion of the compute, memory, and network resources of the underlying computer system 275, for example. The VM 255 executes a VM OS 245, sometimes referred to as a guest OS, that supports execution of a database server 235. The VM OS 245 includes a connection manager 247 such as a TCP sockets implementation.

In a first example, the VM 255 is to be restarted on the same computer system 275. The database server 235 includes an SMC 240. Like the SMC 210, the SMC 240 is a software component that stores and loads state data associated with the database server 235 (e.g., session-specific variables for each established connection to a database client prior to a restart). The VM OS 245 includes an SMC 250. The SMC 250 stores and loads state data associated with the network-level communications context between the database server 235 and database clients. For example, the SMC 250 may store the data contained in the socket data structures created by the CM 247 (e.g., including an IP address and port number of a database client). The hypervisor 260 further includes an SMC 257 that preserves state data related to the routing of data between the host OS 270 and the VM 255 and/or VM OS 245. After the SMCs 240, 250, 257 have stored the state data, the VM 245 is restarted without closing any established connections (e.g., sockets)

maintained by the connection manager 265. As described herein, the a "restarted" VM (not shown) may be launched while the VM 255 continues to execute or after terminating the VM 255. Often the restarted VM launches into a default state as described above (e.g., based on a machine image and various parameters associated with the command to execute the virtual machine). Once restarted, the SMCs 240, 250 of the restarted VM load the stored state data allow the restarted VM to resume communications with the connected database clients. In one embodiment, the CM 247 includes an API that allows the SMC 250 to create TCP sockets outside of the traditional TCP handshake initiated by a client application. Additionally, the SMC 257 re-establishes the routing of data between the sockets preserved over the course of the restart by the connection manager 265 of the host OS 270 and the restarted VM and/or VM OS.

In a second example, the VM 255 is to be restarted on a different computer system (not shown). In addition to the state preservation and restoration described for the first example, the host OS 270 includes an SMC 267 that preserves network-level communications context between the database clients and the host OS 270. Note that in some embodiments, the CM 265 rejects inbound communications from database clients during this period to cause the database clients to continue to re-send rejected communications. A control plane component of the provider network hosting the computer system 275 and the computer system of the restarted VM can then assign the IP address of the VM 255 to the restarted VM to cause a routing component of the provider network to begin routing traffic from the database clients to the new VM. The SMC of the host OS of the computer system executing the restarted VM can use the stored context from SMC 267 to resume network-level communications with the database clients.

Other application environments than the ones illustrated in FIGS. 2A and 2B are possible. For example, a database server may be executed within a container supported by a container engine, which itself may or may not be hosted within a virtual machine or host OS.

Figure 3:
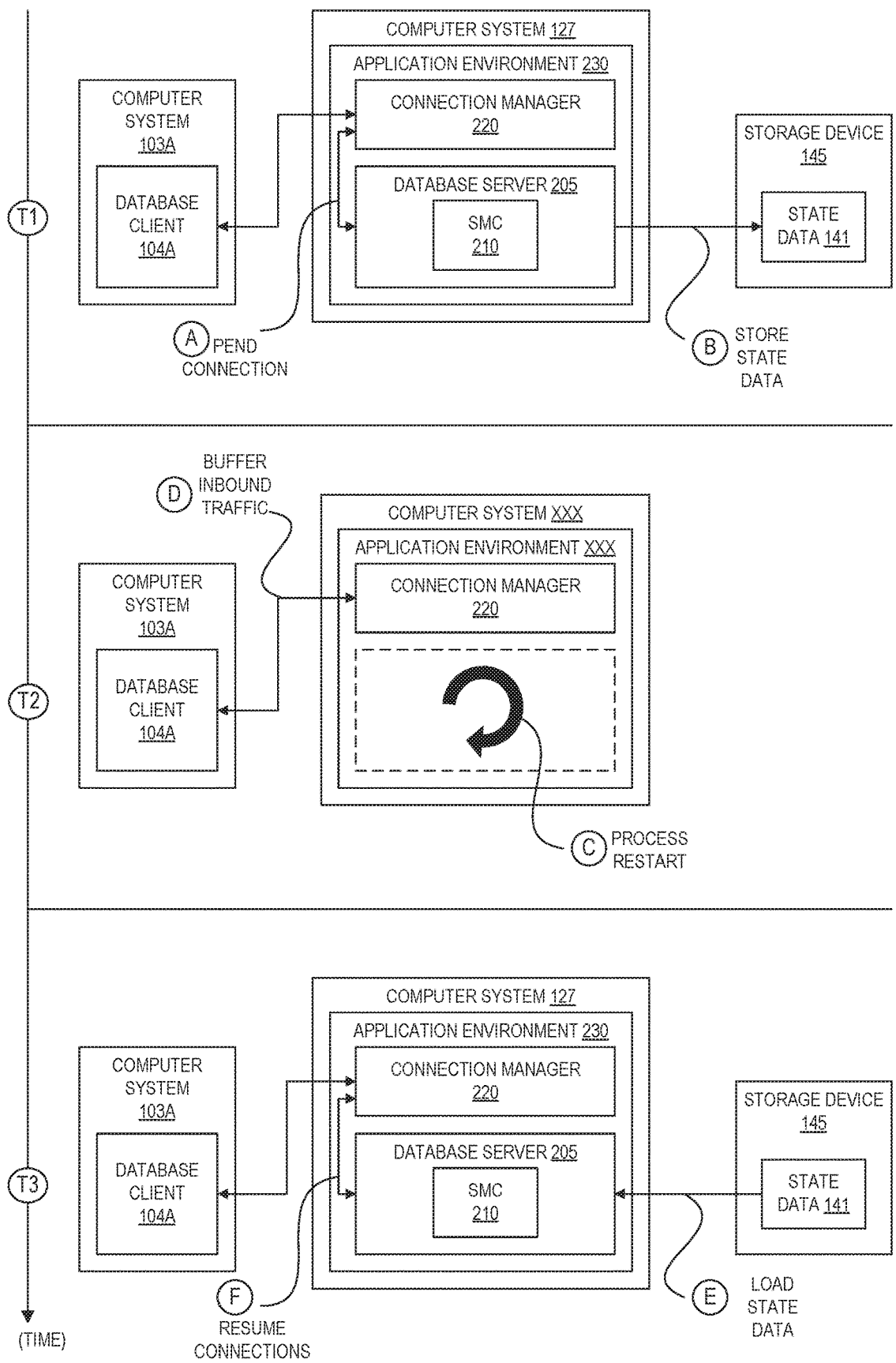
FIG. 3 is a diagram illustrating a database server restart according to some embodiments.

FIG. 3 is a diagram illustrating a database server restart according to some embodiments. From top to bottom, FIG. 3 illustrates phases of the database server restart at times T1, T2, and T3 where a connection is maintained between a database client 104A executed by the computer system 103A and a database server 205 supported by an application environment 230 executed by the computer system 127 during a restart of the database server 205. In this example, the database client 104A and the database server 205 have communications using the connection manager 220, which may be a TCP-based sockets implementation. In particular, the database server 205 has obtained a file descriptor that can identify the connection with the database client 104A and allows the database server 205 to read data from the database client 104A that is buffered by the connection manager 220 and to send data to the database client 104A.

Beginning at time T1, a restart of the database server 205 has been initiated. As indicated at the encircled letter A, the database server 205 pends the connection with the connection manager 220. Pending the connection may simply involve the database server 205 ceasing read operations from the buffer of the connection manager 220 or sending a message to the connection manager 220 to keep the socket active when the database server terminates for restart. As indicated at circle B, the state data 141 associated with the communications between the database client 104A and the database server 205 is stored in the storage device 145. The packaging and transfer of state data 141 may be managed by the SMC 210, as described above. The state data 141 may include various session-specific variables in the application-level communications between the client and server and may further include an identifier of the file descriptor of the pended socket.

Sometime later at time T2 (e.g., once the state data 141 has been stored in the storage device 145), the database server is restarted (e.g., the process is forked into a child process, the database server is launched into the child process, and the parent process exits), as indicated at circle C. During this time, the connection manager 220 continues to buffer inbound traffic from the database client 104A in a buffer, as indicated at circle D. As the buffer fills, the connection manager 220 can employ flow control techniques to slow or stop traffic from the database client 104A. Note that in some embodiments, the connection manager 220 can avoid buffering inbound traffic from the database client 104A by not sending acknowledgements of received packets to force the TCP implementation at the other end of the connection to resend packets.

At time T3, either during startup of the database server 205 or immediately after startup, the database server 205 loads the state data 141 from the storage device 145. As described above, the loading of state data may be conditioned on a parameter associated with the launch of the process or with a flag that the database server 205 set when storing the data and checks upon launch. Again, the SMC 210 may manage the retrieval of the state data 141 and resuming the communications sessions. The database server 205 can resume communications via the connection that was persisted during the course of the restart (e.g., using the file descriptor that was stored with the state data 141).

Figure 4:
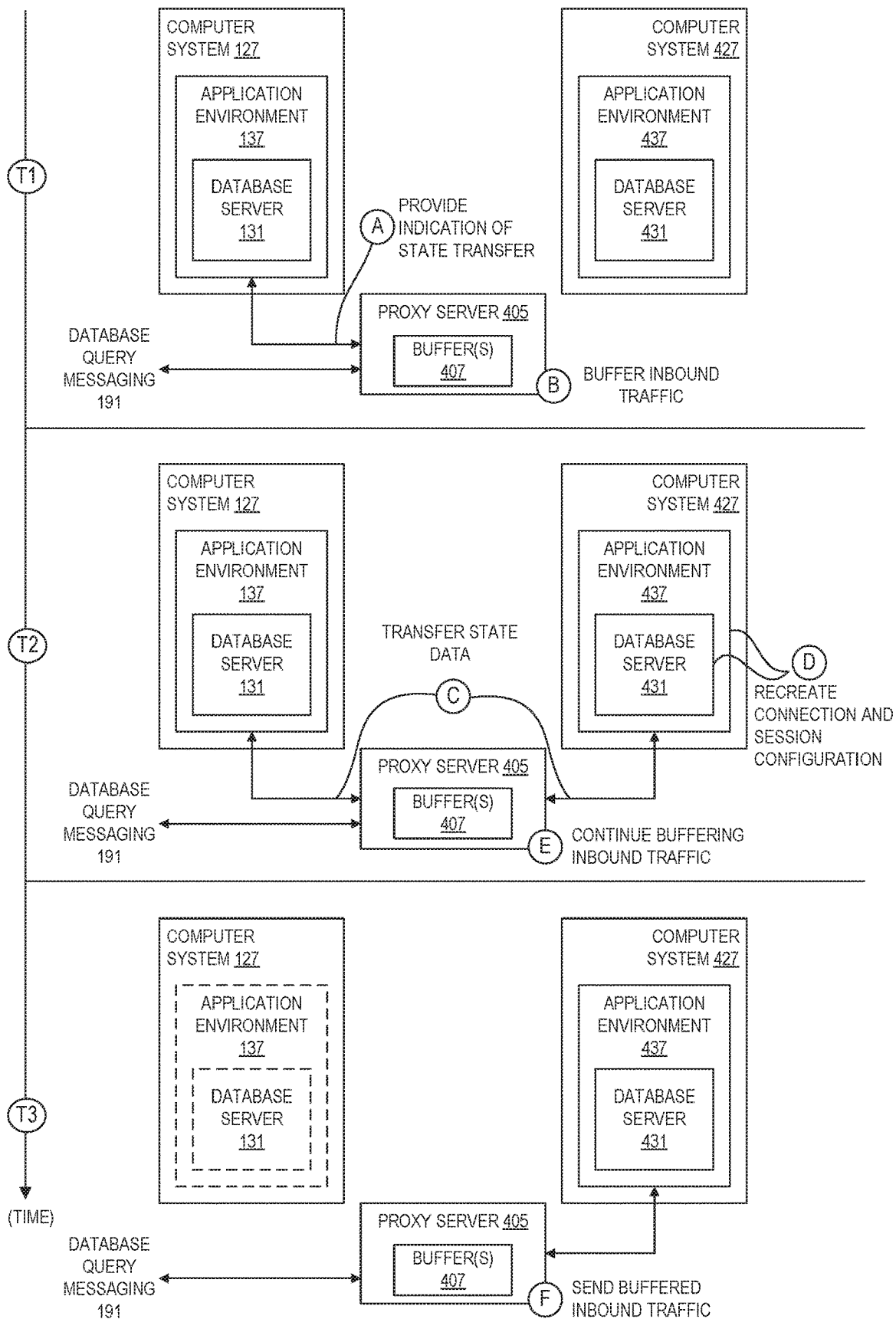
FIG. 4 is a diagram illustrating a database server transfer from one computer system to another computer system according to some embodiments.

FIG. 4 is a diagram illustrating a database server transfer from one computer system to another computer system according to some embodiments. From top to bottom, FIG. 4 illustrates phases of the database server "restart" at times T1, T2, and T3. Here, restart is achieved by launching the database server in its default configuration on a different computer system than the one hosting the database server before the restart. The state data associated with the open communications sessions with database clients is transferred to the newly launched database server that proceeds to continue communications with the database clients. The database server 131 is supported by an application environment 137 executed by the computer system 127. In some embodiments, one or more database clients (e.g., database clients 104) have open communications sessions with the database server 131 via which they submit queries 191. In other embodiments, a proxy server serves as the endpoint to which the database clients 104 have established communications, and the proxy server routes received queries to one or more database servers of the database instance, including to the database server 131 before restart and to the database server 431 after restart.

Sometime prior to time T1, a decision to restart the database server 131 is made. For example, a user can cause the application 106 to send a command to the database service 105 to initiate the restart of the database server 131. The database server provisions a computer system 427 to host a database server 431 having a default configuration and supported by an application environment 437 having a default configuration. As indicated at circle A, the application environment 137 can send a message to a proxy server 405 that was routing queries 191 to the computer system 127. As indicated at circle B, the proxy server 405 can begin buffering inbound traffic destined for the database server 131 in one or more buffers 407. In the case where the proxy server 405 was the endpoint for communications with the database clients 104, the proxy server 405 can buffer inbound traffic and send it to the restarted database server 431 once launched. In the case where the database clients 104 had established communications with the database server 131, the proxy server 405 can buffer traffic with layer 4/5 routing data directed to the IP address and port number associated with the database server 131.

At time T2, the application environment 137 sends the state data such as described elsewhere herein to the application environment 437 as indicated at circle C. The state data can include session names and session-specific variables for any open communications sessions between database clients and the database server 131. If the database clients 104 had established communications sessions with the database server 131 as an endpoint (rather than the proxy server 407), the state data can further include data to recreate the established sockets of the application environment 137 (e.g., the IP address and port number combinations associated with each database client having an established connection with the database server 131). As indicated at circle D, the database server 431 can create new sessions that replicate the state of sessions between the database clients and the database server 131. For example, the database server 431 can use the session names and session specific variables in the state data to create new sessions having the same names and respective variables. Further, if the database clients 104 had established communications sessions with the database server 131 as an endpoint (rather than the proxy server 407), the application environment 437 can create new connections that replicate the connections established by the application environment 137 between the database clients and the database server 131. As mentioned elsewhere, the application environment 437 or a connection manager thereof (not shown) can include an API that allows the creation of TCP sockets outside of the traditional TCP handshake initiated by a client application. While the configuration of the application environment 137 and database server 131 is being matched by the application environment 437 and database server 431, the proxy server 405 continues to buffer inbound data as indicated at circle E.

At time T3, the proxy server 405 can cut in the database server 431 and the application environment 437 to handle communications from the database clients originally communicating with the database server 131 or to route communications destined to the proxy server 405 to the restarted database server 431. Note that in some embodiments, the IP address of application environment 437 may be different than the IP address of the application environment 137. In such cases, the change may be transparent to the database clients as the proxy server 405 was forwarding queries directed to a common endpoint to the application environment 137 unbeknownst to the database clients. Further, the resources provisioned for the database server 131, including the application environment 137 (e.g., a VM) can be released.

Although the transfer of state data in FIG. 4 occurred via the proxy server, in some embodiments the state data can be transferred via a network-connected storage device (e.g., the storage device 145).

Figure 5:
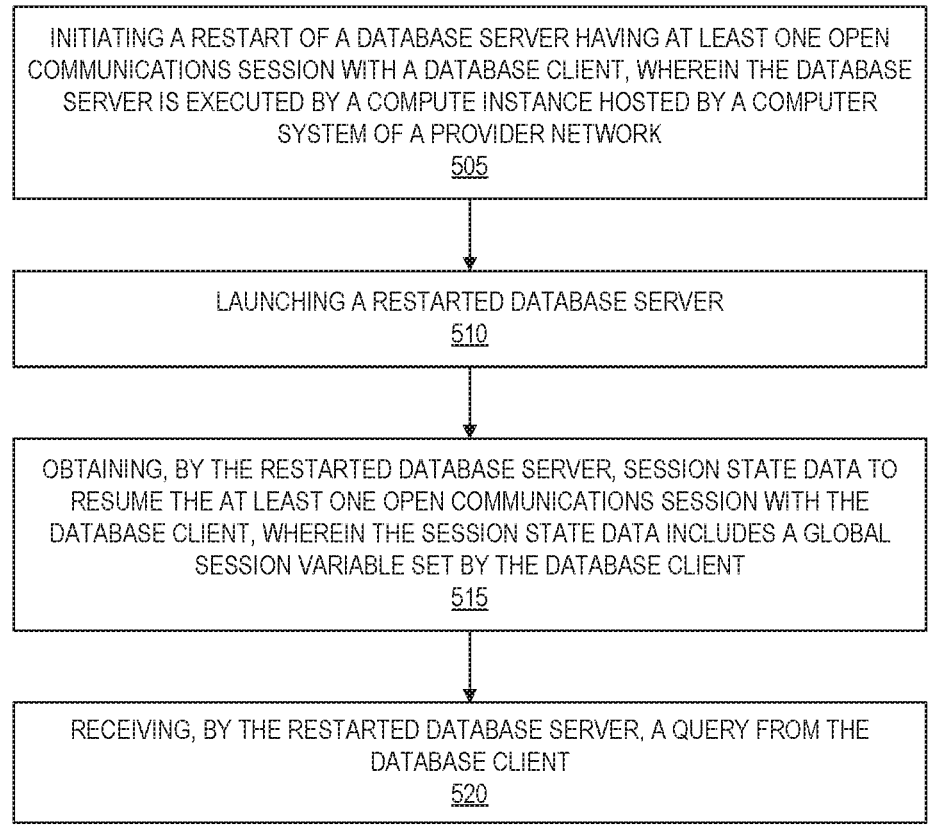
FIG. 5 is a flow diagram illustrating operations of a method for context preservation during server restart according to some embodiments.

FIG. 5 is a flow diagram illustrating operations of a method for context preservation during server restart according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by one or more computer systems executing a database server of the other figures.

The operations include, at block 505, initiating a restart of a database server having at least one open communications session with a database client, wherein the database server is executed by a compute instance hosted by a computer system of a provider network. As described herein, a provider network can leverage virtualization technologies to provision compute and storage resources for customers. A database service of the provider network can allow customers to configure and launch a database instance within the provider network. The database instance can include a database server that receives queries from database clients and executes them against the database. Various entities may initiate a restart of a database server, such as the database server itself, an application environment supporting the database server (e.g., an operating system), another service of the provider network, or the user/customer that owns the database instance. In some embodiments, the initiation of a restart may be conditioned on a high level of usage of a computing resource of the underlying host computer system such as a high amount of memory usage that may be indicative of a memory leak.

The operations further include, at block 510, launching a restarted database server. As described herein, the database server is a software application. As such, a restarted database server can have many forms, such as another database server launched while the original database application continues to execute within the same application environment, another database server launched after the original database server has been terminated, or another database server launched in a different application environment. In some embodiments, the restarted database server has a default configuration. In some embodiments, the command to launch the restarted database server includes a parameter to indicate to the process that restarted database server will be taking over the existing communications sessions.

The operations further include, at block 515, obtaining, by the restarted database server, session state data to resume the at least one open communications session with the database client, wherein the session state data includes a session variable set by the database client. To transfer open communications sessions between database servers, the original database server preserves state data related to each open communications session with a database client in a storage device such as a local memory of the computer system hosting the database server or a storage device connected to the computer system via the provider network. Such state data can include, as described above, a session name and one or more session-specific variables. As indicated above, the restarted database server may have received a launch parameter to cause it to fetch the state data from the storage device or may automatically check the storage device to check whether the contained state data includes a flag indicating the state data should be restored. In some embodiments, the restarted database server may receive the state data from the computer system hosting the original database server (e.g., via a proxy server). Using the obtained state data, the restarted database server creates a session for each of the open communications sessions between database clients and the original database server (e.g., to modify the default session configuration to match the session configuration of the original database server).

The operations further include, at block 515, receiving, by the restarted database server, a query from the database client. Once the restarted database server has been configured to handle the existing sessions, the restarted database server can be cut in to begin handling queries to a database from the database clients that had open communications sessions with the original database server, for example.

Figure 6:
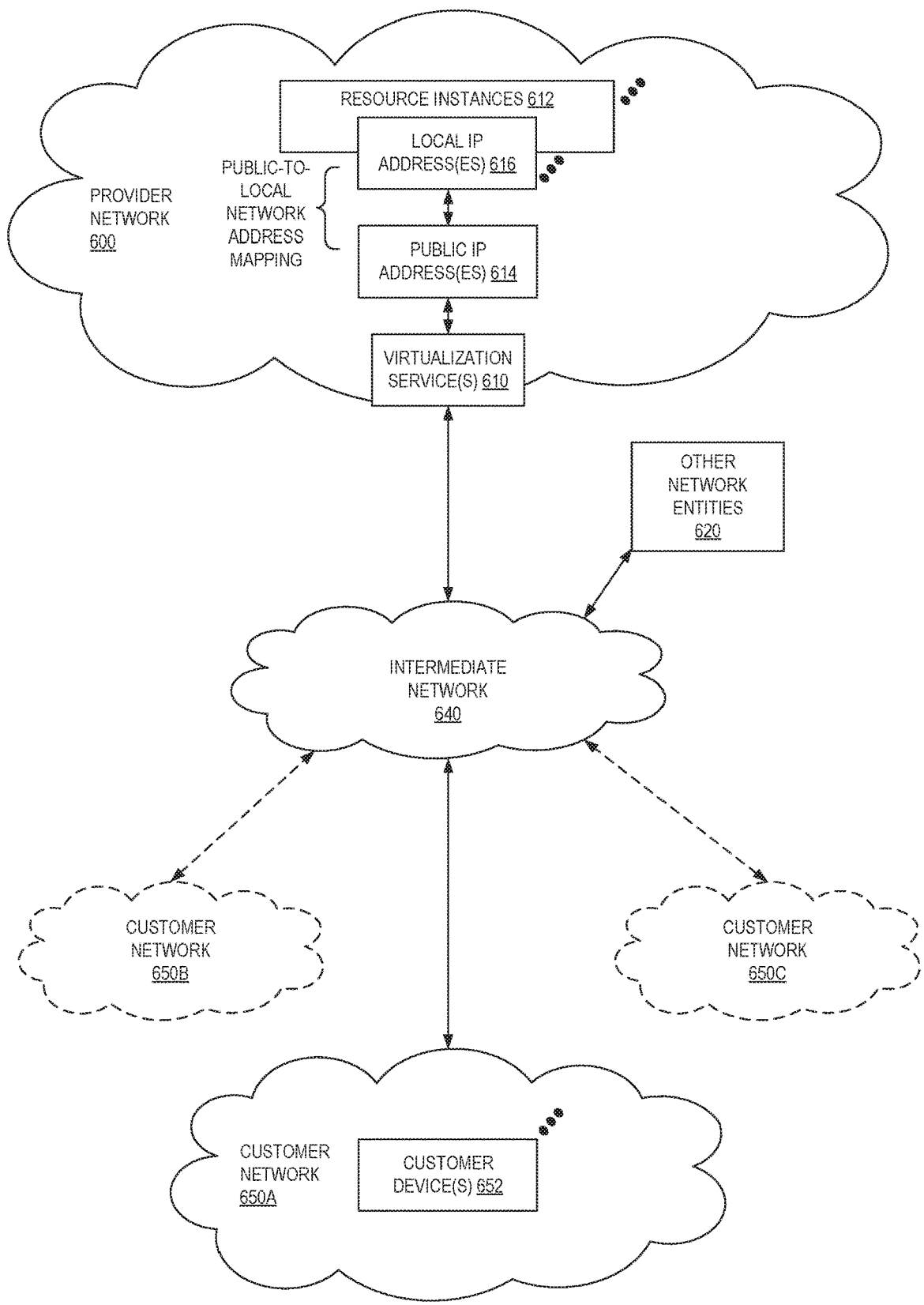
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
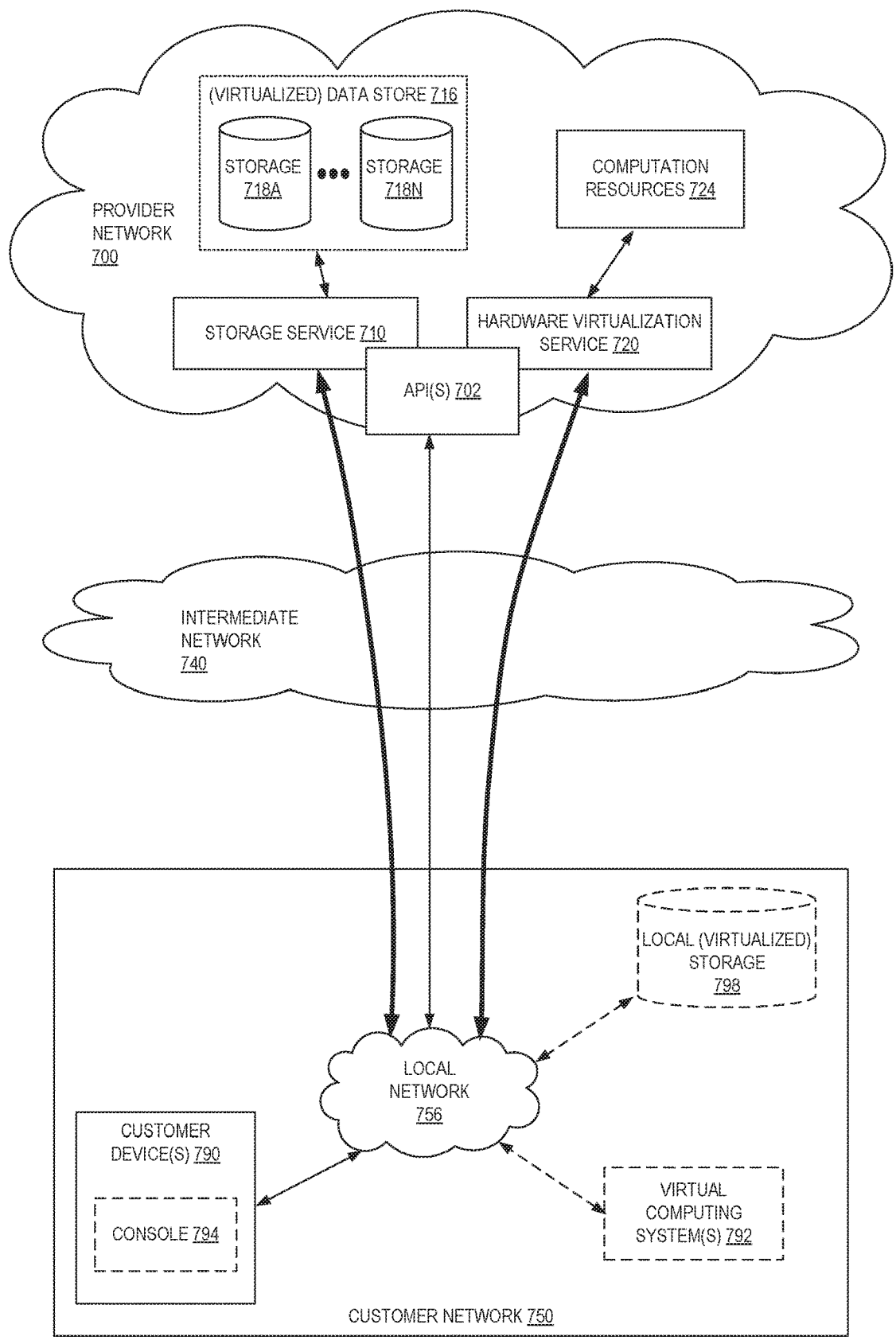
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

In some embodiments, a system that implements a portion or all of the techniques for context preservation during server restart as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to restart a database server having at least one open communications session with a database client, wherein the database server is an application supported by an operating system executed by a virtual machine hosted by a first computer system of a provider network, and wherein the database client is executed by a second computer system;
pending a connection between the database server and a connection manager of the operating system executed by the virtual machine hosted by the first computer system;
writing, by a state manager of the database server to a memory device, session state data associated with the at least one open communications session with the database client, the session state data including one or more session-specific variables associated with the at least one open communications session with the database client and a file descriptor associated with an established Transmission Control Protocol (TCP) connection to the database client;
launching, by the operating system, a restarted database server;
reading, by the state manager from the memory device, the session state data;
in response to the launching of the restarted database server, buffering, by the connection manager of the operating system executed by the virtual machine hosted by the first computer system, during a period of time when the database server is restarting, inbound data from the database client executed by the second computer system for the at least one open communications session with the database client;
reading, by the restarted database server, the inbound data;
restoring, by the state manager using the session state data, the at least one open communications session within the restarted database server; and
receiving, by the restarted database server, a transaction from the database client.

2. The computer-implemented method of claim 1, wherein the session state data further includes an identification of a transaction received from the database client that will be interrupted by a restart, and further comprising sending an error message associated with the transaction to the database client.

3. The computer-implemented method of claim 1, further comprising storing, at the memory device, a network context of the connection between the database server and the connection manager of the operating system.

4. A computer-implemented method comprising:
initiating a restart of a database server having at least one open communications session with a database client, wherein the database server is executed by a compute instance hosted by a first computer system of a provider network, and wherein the database client is executed by a second computer system;
pending a connection between the database server and a connection manager of the compute instance hosted by the first computer system;
storing, at a memory device, one or more session-specific variables associated with the at least one open communications session with the database client;
launching a restarted database server;
obtaining, by the restarted database server from the memory device, one or more session-specific variables;
in response to the launching of the restarted database server, buffering, by the connection manager of the compute instance hosted by the first computer system, during a period of time when the database server is restarting, inbound data received from the database client executed by the second computer system via the at least one open communications session with the database client;
reading, by the restarted database server, the inbound data;
resuming the at least one open communications session with the database client using the one or more session-specific variables; and
receiving, by the restarted database server, a transaction from the database client.

5. The computer-implemented method of claim 4, wherein the restarted database server is executed by another compute instance hosted by another computer system of the provider network.

6. The computer-implemented method of claim 4, wherein the restarted database server is executed by the compute instance.

7. The computer-implemented method of claim 4, further comprising storing, at the memory device, a network context of a connection established between the database client and the database server.

8. The computer-implemented method of claim 4, further comprising terminating the database server, wherein the at least one open communications session with the database client remains in an established state after terminating the database server to allow the restarted database server to resume the at least one open communications session.

9. The computer-implemented method of claim 4, wherein the restarted database server obtains the one or more session-specific variables from a proxy server of the provider network.

10. The computer-implemented method of claim 4, further comprising sending an error message associated with a transaction that will be interrupted by a restart to the database client.

11. The computer-implemented method of claim 4, further comprising sending an error message associated with a transaction that was interrupted by a restart to the database client, and obtaining, by the restarted database server from the memory device, an identification of the transaction.

12. A system comprising:
a first one or more electronic devices of a first computer system of a provider network;
a database implemented by the first one or more electronic devices of the first computer system of the provider network; and
an application environment implemented by a second one or more electronic devices of the first computer system of the provider network, the application environment including instructions that upon execution cause the application environment to:
initiate a restart of a database server having at least one open communications session with a database client, wherein the database server is executed by a compute instance hosted by the first computer system, and wherein the database client is executed by a second computer system;
pend a connection between the database server and a connection manager of the compute instance hosted by the first computer system;
store one or more session-specific variables associated with the at least one open communications session with the database client;
launch a restarted database server to access the database;
cause the restarted database server to obtain the one or more session-specific variables and resume the at least one open communications session with the database client using the one or more session-specific variables;
in response to the launch of the restarted database server, buffer, by the connection manager of the compute instance hosted by the first computer system, during a period of time when the database server is restarting, inbound data received from the database client executed by the second computer system via the at least one open communications session with the database client;
cause the restarted database server to read the inbound data; and
cause the restarted database server to receive a transaction from the database client.

13. The system of claim 12, further comprising storing, at a memory device, a network context of a connection established between the database client and the database server.

14. The system of claim 12, the application environment including further instructions that upon execution cause the application environment to terminate the database server, wherein the at least one open communications session with the database client remains in an established state after terminating the database server to allow the restarted database server to resume the at least one open communications session.

15. The system of claim 12, the application environment including further instructions that upon execution cause the application environment to cause the database server to send an error message associated with a transaction that will be interrupted by a restart to the database client.

16. The system of claim 12, the application environment including further instructions that upon execution cause the application environment to cause the restarted database server to send an error message associated with a transaction that was interrupted by a restart to the database client, and obtain an identification of the transaction.

17. The system of claim 12, wherein the one or more session-specific variables are set by the database client.

18. The system of claim 12, wherein the one or more session-specific variables include a MySQL session variable.

19. The system of claim 12, wherein the restarted database server is executed by another electronic device of the provider network.

20. The system of claim 12, wherein the restarted database server is executed by the first one or more electronic devices of the provider network.

* * * * *